No. 725,966. PATENTED APR. 21, 1903.
F. B. HOWARD.
APPARATUS FOR MAKING PULP VESSELS.
APPLICATION FILED JAN. 16, 1902.
NO MODEL. 2 SHEETS—SHEET 1.
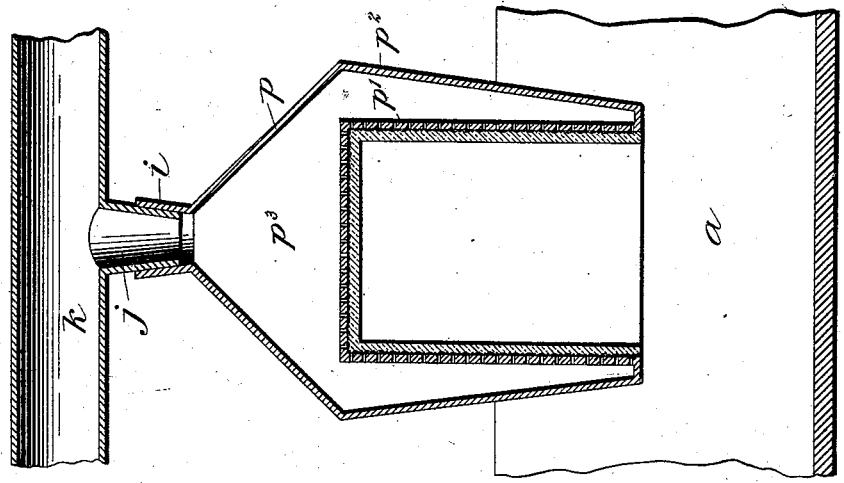
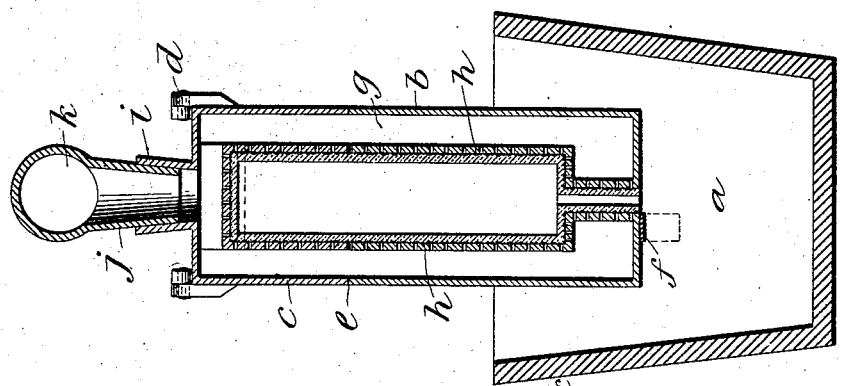
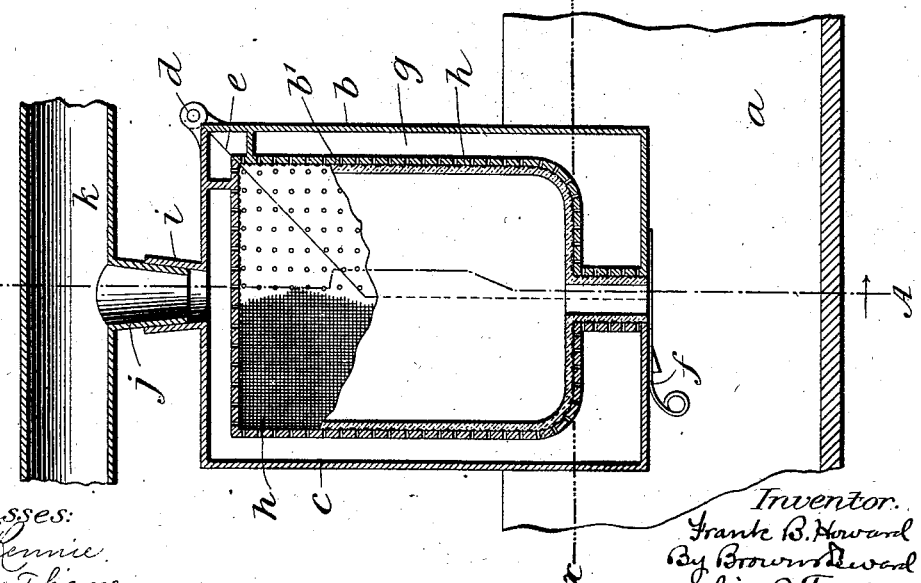
Witnesses:
J. A. Rennie.
Henry Thieme.
Inventor.
Frank B. Howard
By Brown & Seward
his Attorneys No. 725,966. PATENTED APR. 21, 1903.
F. B. HOWARD.
APPARATUS FOR MAKING PULP VESSELS.
APPLICATION FILED JAN. 16, 1902.
NO MODEL. 2 SHEETS—SHEET 2.
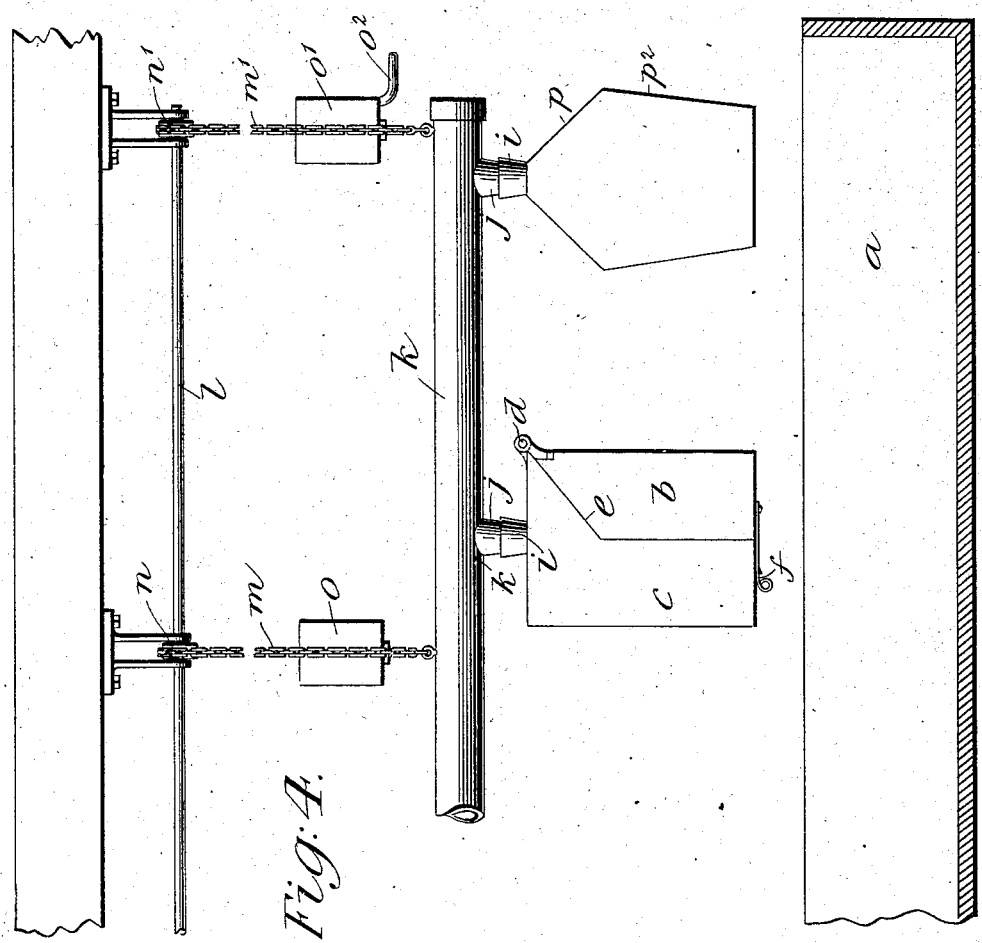

UNITED STATES PATENT OFFICE.

FRANK B. HOWARD, OF NEW YORK, N. Y., ASSIGNOR TO LAFLIN & RAND POWDER COMPANY, OF NEW YORK, N. Y., A CORPORATION OF NEW YORK.

APPARATUS FOR MAKING PULP VESSELS.

SPECIFICATION forming part of Letters Patent No. 725,966, dated April 21, 1903.

Application filed January 16, 1902. Serial No. 90,028. (No model.)

*To all whom it may concern:*

Be it known that I, FRANK B. HOWARD, a citizen of the United States, and a resident of the borough of Manhattan, in the city and State of New York, have invented a new and useful Apparatus for Making Pulp Vessels, of which the following is a specification.

My invention relates to apparatus for making pulp vessels, with the object in view of providing efficient and expeditious means for forming vessels of this character and more particularly the smaller-sized vessels.

The apparatus, broadly considered, consists in means for lowering and raising one or more molds into and out of a tank of pulp while the molds are connected with a suitable vacuum appliance.

In the accompanying drawings, Figure 1 represents in detail, in vertical section, one of the molds attached to the nozzle of a pipe leading to a vacuum appliance and suspended within a tank of pulp held in suspension. Fig. 2 is a vertical section in the plane of the line A A of Fig. 1, taken at right angles to the section shown in Fig. 1. Fig. 3 represents a similar view of a modified form of mold. Fig. 4 represents, in side elevation, the means for lowering and raising a plurality of the molds into and out of the pulp-receptacle; and Fig. 5 is a view of the same, showing the pulp-receptacle in transverse section.

Referring to Figs. 1 and 2, $a$ represents a tank for holding pulp in suspension, the height at which the pulp in suspension is maintained within the tank being denoted by the dotted line X X. The mold for forming the vessel consists in the present instance of two parts $b$ $c$, hinged together at $d$ and opening along the line $e$. (Clearly indicated in Fig. 4.) The parts may be locked together by a snap-fastening $f$. The mold is provided with a hollow interior space $g$, the inner wall $b'$ of the mold being provided with numerous perforations and with a lining $h$, formed of wire-gauze.

The mold shown in Figs. 1 and 2 is designed to form a flattened flask with a nozzle, and the interior of the mold is shaped with this in view. The chamber $g$, which surrounds the inner perforated wall of the mold, is in communication through a mouth $i$ and nipple $j$ with the interior of a pipe $k$, leading to a suitable vacuum-forming appliance of any known or approved form. (Not shown herein.) The wall of the mouth $i$ is intended to fit snugly on the tapered nipple $j$, so as to hold the mold suspended by frictional contact in order that the mold may be readily removed for the purpose of substituting another for it or readjusting it for another operation after the pulp vessel has been removed from its interior. The pipe $k$, leading to the vacuum appliance, is, together with the molds attached thereto, suspended from a rotary shaft $l$ by means of chains $m$ $m'$, which lead from the pipe $k$ up and over sprocket-wheels $n$ $n'$ on the shaft $l$ and thence down to counterbalance-weights $o$ $o'$. One of the weights—for example, the weight $o'$—may be provided with a handle $o^2$ for the purpose of enabling the operator to lower and raise the pipe $k$, with the molds attached thereto, into and out of the pulp-containing tank $a$.

The mold represented in Fig. 3 is attached to the pipe $k$ in the same manner as the mold already described and is introduced simply for the purpose of showing another of numerous forms of mold which may be used in this connection. In fact, any form of mold whatever may be employed to suit the size and shape of the pulp vessel to be molded.

The form of mold shown in Fig. 3 is adapted to form a pulp vessel of cylindrical form open at one end and closed at the opposite end. For this purpose the interior perforated wall $p'$ of the mold $p$ is made cylindrical in shape, with its lower end opened, and the vacuum-chamber $p^3$ is formed between the inner perforated wall $p'$ and outer wall $p^2$ of the mold.

In operation, the molds having been placed in position, they are lowered until their open ends are immersed within the suspended pulp within the tank, and then vacuum is established within the pipe $k$ and from it through the nipples $j$ and mouths $i$ in the space surrounding the perforated wall of the mold, thereby causing the suspended pulp to rise within the mold and seek to escape through the perforated wall of the mold and by so doing deposit itself in a compact layer along the inner wall of the mold up to the limit of the pressure established by the tank on the exterior. The water which is drawn through the perforations while the pulp is being deposited on the inner wall of the mold passes along the pipe $k$ and through the suction-pump or other vacuum appliance out of the way. When the pulp has been deposited to a sufficient extent to form the wall of the vessel, the molds are lifted out of the tank and removed from their nipples $j$ to a suitable drying apparatus, and other molds may be substituted in their place, so that the operation of forming the vessels may be continued while the drying is going on, or the drying may take place sufficient to permit the pulp vessel to be removed from the mold, and then the mold in which it was formed may itself be replaced on its nipple and another vessel formed.

It is obvious that the means for raising and lowering the molds and for connecting them to the vacuum appliance is only one of numerous forms which may suggest themselves to a person skilled in the art. Hence I do not wish to limit myself strictly to the structure herein shown and described; but

What I claim is—

1. Apparatus for molding pulp vessels comprising a mold having interior perforated walls and vacuum-chambers surrounding the interior perforated walls, the said molds being composed of sections arranged to open to permit the discharge of the molded article, a pipe leading to a vacuum appliance, means for removably attaching the mold to the pipe leading to the vacuum appliance and means for lowering and raising the mold while attached to the pipe.

2. Apparatus for molding pulp vessels comprising a vacuum-chamber common to a plurality of molds, the said vacuum-chamber being provided with nipples one for each mold, molds provided with tapered mouths adapted to frictionally engage the said nipples in removable adjustment, the said molds being provided with perforated interior walls and vacuum-chambers surrounding the said perforated walls and means for raising and lowering the said common vacuum-chamber and hence the molds attached thereto.

In testimony that I claim the foregoing as my invention I have signed my name, in presence of two witnesses, this 11th day of January, 1902.

FRANK B. HOWARD.

Witnesses:
FREDK. HAYNES,
HENRY THIEME.